United States Patent
Iwata

(10) Patent No.: US 7,761,620 B2
(45) Date of Patent: Jul. 20, 2010

(54) COMMUNICATIONS DEVICE, AND COMMUNICATIONS METHOD FOR ENABLING RECEPTION OF REAL-TIME EXECUTION COMMANDS WHEN A RECEIVE BUFFER IS FULL

(75) Inventor: Masaji Iwata, Saitama (JP)

(73) Assignee: Citizen Holdings Co., Ltd., Tokyo (JP)

( * ) Notice: Subject to any disclaimer, the term of this patent is extended or adjusted under 35 U.S.C. 154(b) by 248 days.

(21) Appl. No.: 11/822,193

(22) Filed: Jul. 3, 2007

(65) Prior Publication Data

US 2008/0010389 A1 Jan. 10, 2008

(30) Foreign Application Priority Data

Jul. 6, 2006 (JP) .............................. 2006-186910

(51) Int. Cl.
*G06F 3/00* (2006.01)
(52) U.S. Cl. ............................ 710/52; 710/29; 710/33; 710/56
(58) Field of Classification Search ................... 710/29
See application file for complete search history.

(56) References Cited

U.S. PATENT DOCUMENTS

| | | | | |
|---|---|---|---|---|
| 5,179,661 A | * | 1/1993 | Copeland et al. ............... | 710/29 |
| 5,544,326 A | * | 8/1996 | Pease et al. .................. | 710/310 |
| 6,031,821 A | * | 2/2000 | Kalkunte et al. ............ | 370/235 |
| 6,065,071 A | * | 5/2000 | Priem et al. ................... | 710/22 |
| 6,081,854 A | * | 6/2000 | Priem et al. ................... | 710/37 |
| 6,389,489 B1 | * | 5/2002 | Stone et al. .................... | 710/57 |
| 6,987,775 B1 | * | 1/2006 | Haywood .................... | 370/429 |
| 7,272,675 B1 | * | 9/2007 | Paul et al. ...................... | 710/52 |
| 7,489,414 B2 | * | 2/2009 | Saida ......................... | 358/1.15 |
| 2002/0024610 A1 | * | 2/2002 | Zaun et al. ................... | 348/366 |
| 2005/0250536 A1 | * | 11/2005 | Deng et al. .................. | 455/558 |
| 2006/0015699 A1 | * | 1/2006 | Fujiwara et al. ............. | 711/162 |
| 2008/0046897 A1 | * | 2/2008 | Odaira et al. ............... | 719/326 |
| 2008/0198189 A1 | * | 8/2008 | Vanhooydonck et al. ....... | 347/9 |

FOREIGN PATENT DOCUMENTS

JP 04-336357 A 11/1992

(Continued)

OTHER PUBLICATIONS

Japanese Office Action dated Oct. 22, 2007, issued in corresponding Japanese patent application No. 2006-186910.

(Continued)

*Primary Examiner*—Henry W. H. Tsai
*Assistant Examiner*—Cheng-Yuan Tseng
(74) *Attorney, Agent, or Firm*—Westerman, Hattori, Daniels & Adrian, LLP

(57) ABSTRACT

A communications buffer and control unit that configure a USB connection endpoint are provided connected by a USB bus to a host device. The control unit changes the receive buffer size of a receive buffer where the communications buffer stores receive data, based on an instruction that is sent from the host device side through USB virtual serial communication, to enable the reception of real-time execution commands by the communications device. This enables the reception of real-time execution commands when the receive buffer on the communications device side is in a buffer-full state in data communications between a host device and a communications device.

10 Claims, 12 Drawing Sheets

FOREIGN PATENT DOCUMENTS

| | | |
|---|---|---|
| JP | 10-333856 A | 12/1998 |
| JP | 2000-207142 A | 7/2000 |
| JP | 2001-202322 A | 7/2001 |
| JP | 2001-217981 A | 8/2001 |
| JP | 2001-265543 A | 9/2001 |
| JP | 2001-265706 A | 9/2001 |
| JP | 2003-316712 A | 11/2003 |
| JP | 2004-334798 A | 11/2004 |
| JP | 2005-18638 A | 1/2005 |
| JP | 2005-117422 A | 4/2005 |
| JP | 2005-202794 A | 7/2005 |

OTHER PUBLICATIONS

Haruka Yamazaki, "Show the Whole Thing, Linking Method, Overview of Internet Programming", Wndows Developer Magazine vol. 12, No. 9, Japan, Shoueisha Co., Ltd. Jan. 7, 2006, p. 103-112.

Haruka Yamazaki, "Show the Whole Thing, Linking Method, Overview of Internet Programming", Wndows Developer Magazine vol. 12, No. 9, Japan, Shoueisha Co., Ltd. Jul. 1, 2006, p. 103-112.

* cited by examiner

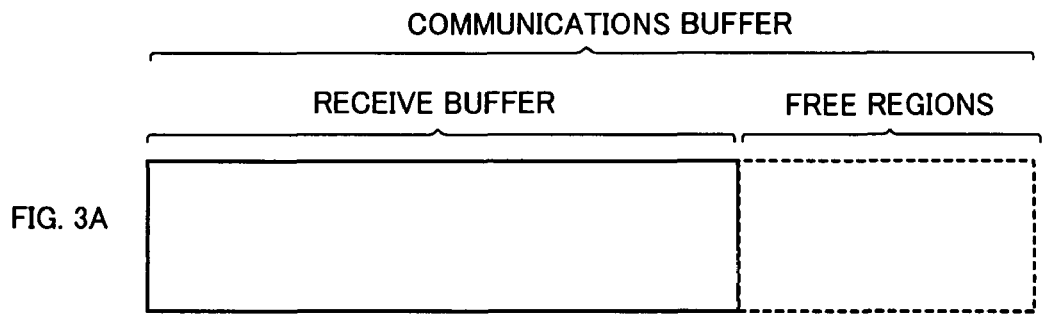
FIG. 3A
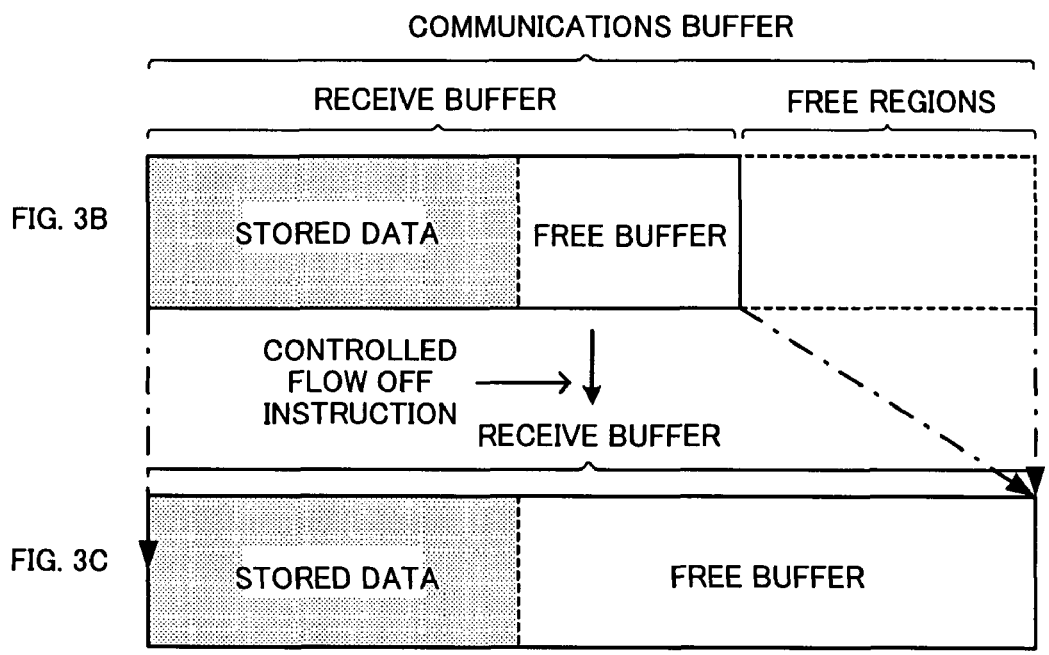
FIG. 3B
FIG. 3C
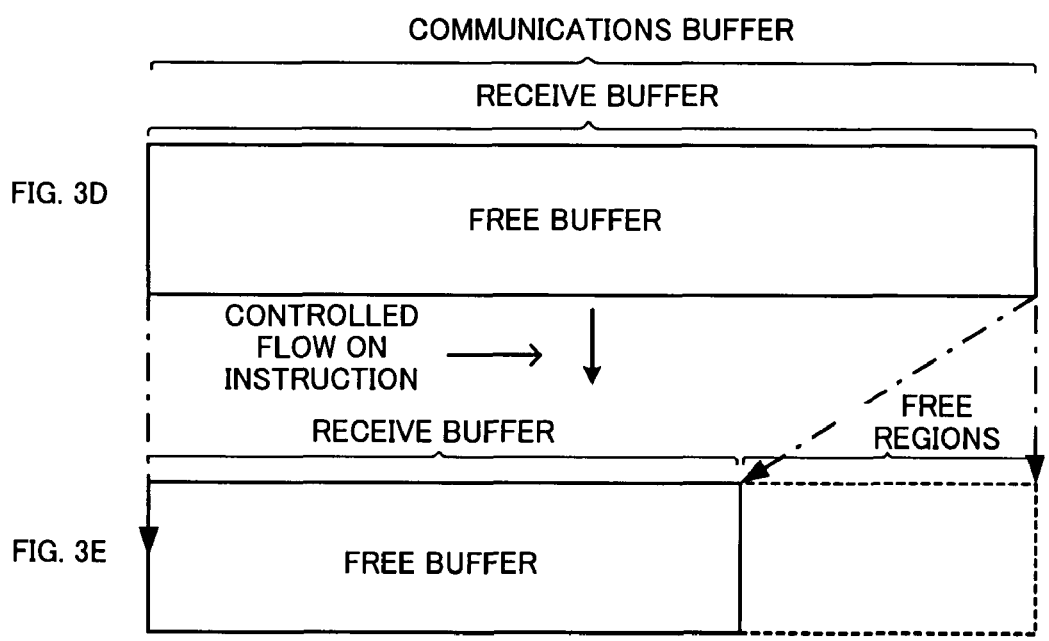
FIG. 3D
FIG. 3E

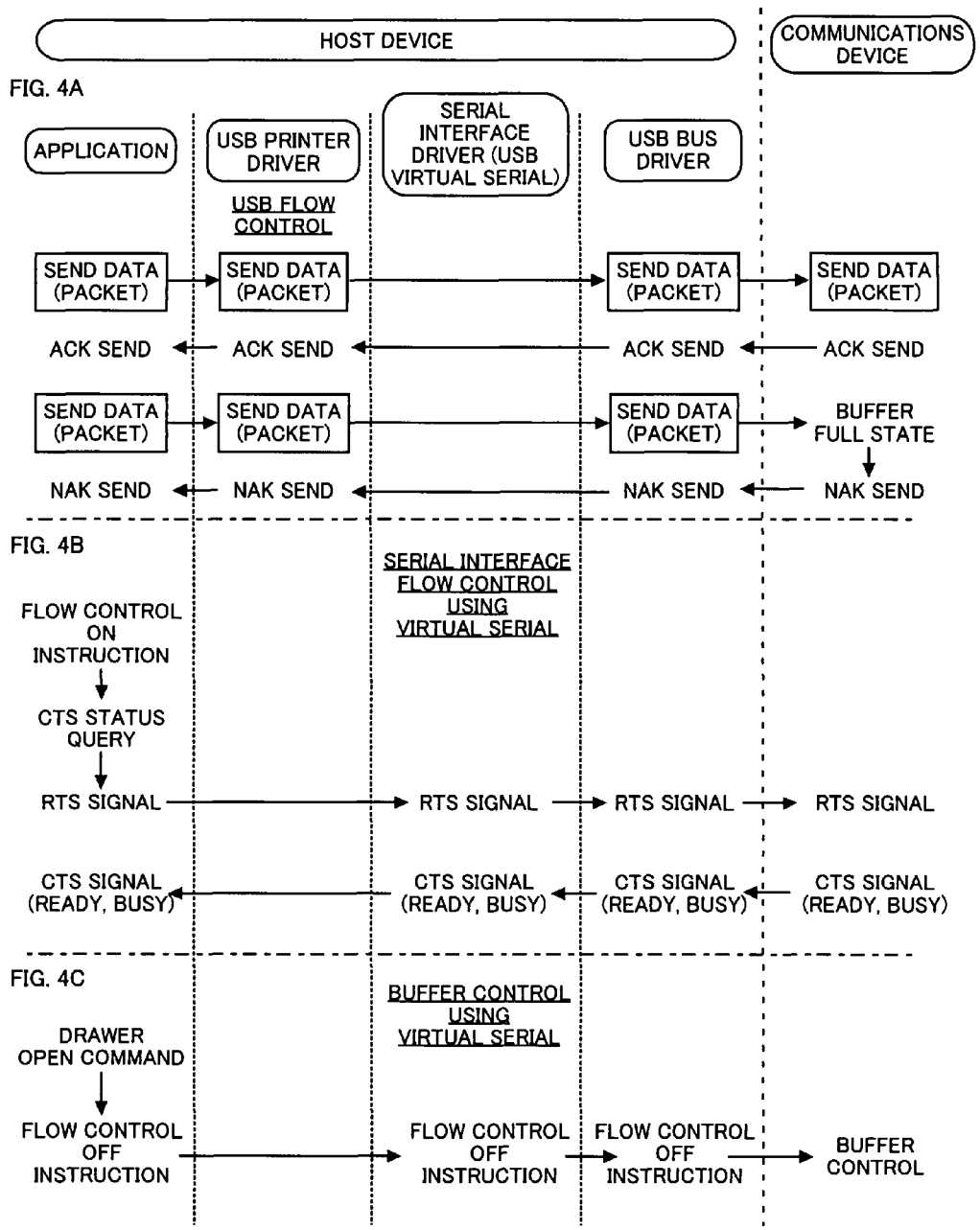

Prior Art

Prior Art

Prior Art
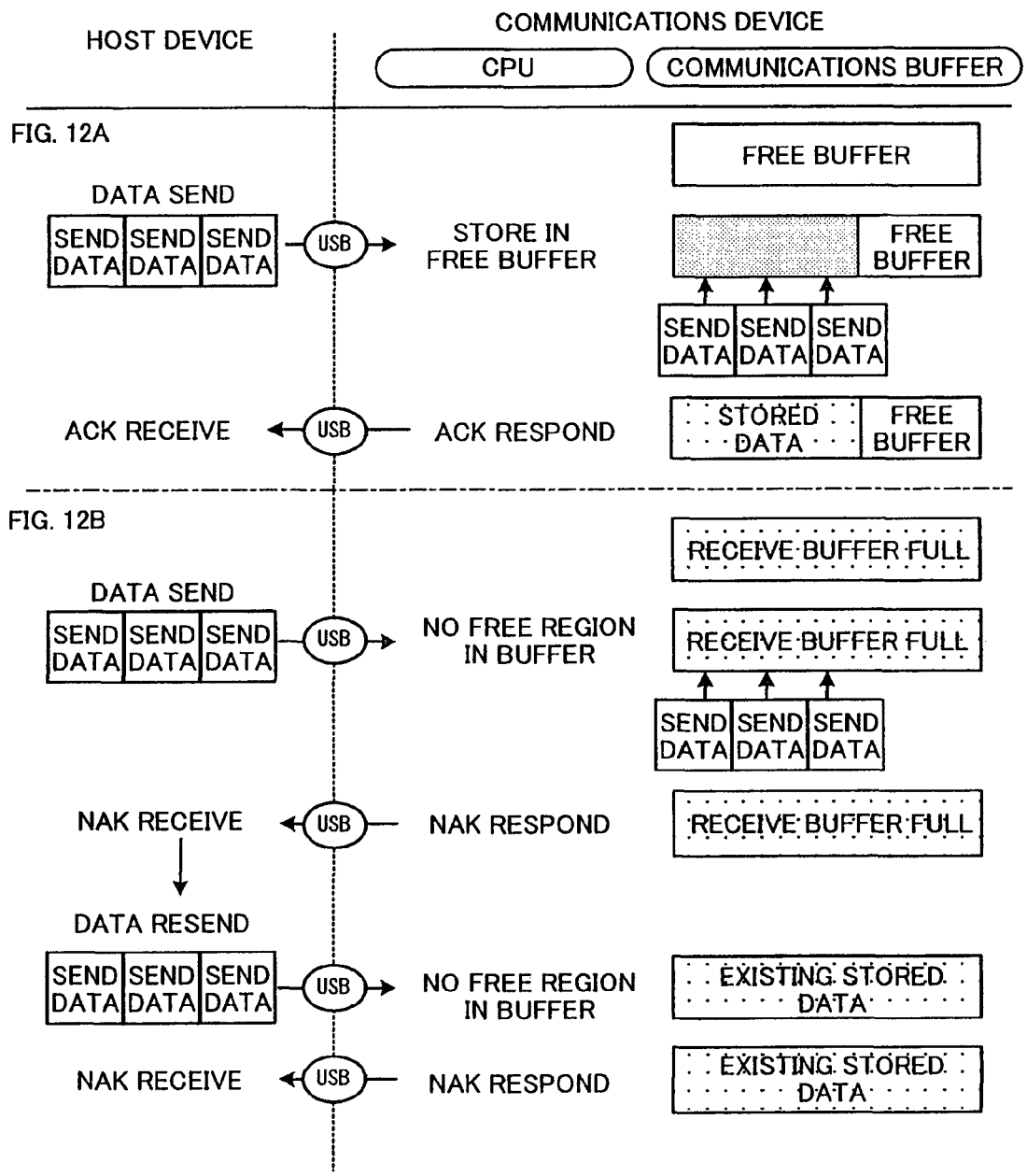

COMMUNICATIONS DEVICE, AND COMMUNICATIONS METHOD FOR ENABLING RECEPTION OF REAL-TIME EXECUTION COMMANDS WHEN A RECEIVE BUFFER IS FULL

BACKGROUND OF THE INVENTION

1. Field of the Invention

The present invention relates to a communications device that is connected with USB connection to a host device and a communications method thereof, and in particular, relates to controlling a buffer-full state when achieving virtual serial communication in a universal serial bus (USB) interface that can be applied to, for example, a point of sale (POS) system where a host device and a printer are connected with USB connection.

2. Description of the Related Art

FIG. 10 is a diagram for explaining the conventional relationship between host devices and printers. For example, in a conventional POS System, the computer that is provided with the host device is structured from an application program 202, such as POS or cash register software, and an operating system part. The operating system performs input/output through an application program interface (API) 203, and through a device driver such as a parallel interface driver 207 or serial interface driver 205, with a parallel port 209, such as an IEEE 1284, or a serial port 208, such as an RS-232, to perform communications with a printer 201. Moreover, in some cases the connection is through a USB printer class driver 204 or a USB bus driver 206.

In recent years computers and peripheral devices (printers) that do not have so-called "legacy" ports such as the IEEE 1284 parallel port or the RS-232 serial interface, but rather only have the USB interface, which has superior cost/performance, have become very popular.

On the other hand, in existing applications there are still many software resources that use the legacy ports, and cannot use USB devices directly, so it is necessary to convert these to applications that use USB interfaces, which involves a great deal of work.

Typically, in serial interfaces, the Xon/Xoff protocol and request to send/clear to send (RTS/CTS) protocol, and the like, are typically used as data flow control. FIG. 11 is a flowchart for the printer side for explaining data flow control in a serial interface.

For example, when data is received on the printer side (S101), if the state of the buffer, or the like, is one wherein reception of data is not possible (S102), then an Xoff code is sent, or the CTS signal is turned OFF, or the like, requesting the host computer to stop sending (S103). In contrast, when the buffer is empty (S104), the Xon code or CTS signal is turned ON to request that sending be restarted (S105). The host computer constantly monitors the CTS Signal or Xoff code to stop or restart sending according to the request.

However, when in a buffer-full state, no data can be received, so at such a time no cash drawer command can be sent, so the drawer cannot be opened. Given this, when the drawer is to be opened, the application instructs the serial interface driver to temporarily not perform flow control, to thereby force the drawer command to be sent in a state wherein the Xoff code and CTS OFF notifications are not monitored.

Even in a USB interface, there is a problem that when the receive buffer is in a full state, receive data cannot be received.

In the USB interface, communications are performed by sending data in packets, and responding with an ACK/NAK for each packet. As with the legacy serial interface, when the buffer is in a full state, the data cannot be received, and an NAK is returned. When the host computer receives the NAK response from the printer, the data packet is resent. This operation is repeated until either a timeout or until an ACK response is received.

In this state, if one wishes to send a drawer command, the data packet and the NAK response are repeated, so the drawer command cannot be sent. In this way, the USB interface is constrained to perform flow control using ACK and NAK responses, and the Xon/Xoff protocol and RTS/CTS flow control are not performed. Because this is not a protocol wherein flow control is not performed, there are no means by which to force data transmission when the printer is in a state wherein data cannot be received, such as is possible in a serial interface, and thus when in a buffer-full state, it is not possible to send commands that have high importance, such as drawer commands.

FIG. 12 is a diagram for explaining the state of communications between the host and a peripheral device using the USB interface. Note that the figure shows the details of the processes performed by the CPU on the peripheral device side, and the state of storage of data in the receive buffer.

FIG. 12A shows the case wherein there is adequate free space in the receive buffer of the peripheral device. When send data is sent from the host side when the receive buffer is in that state, the send data is stored in the receive buffer on the peripheral device side, and an ACK response is sent to the host side to provide notification that the data was received correctly. The host side receives the ACK response to confirm the successful reception.

On the other hand, FIG. 12B shows the state wherein there is not adequate free space in the receive buffer of the peripheral device. When send data is sent from the host side when there is not adequate space in the receive buffer, the peripheral side denies storage of the send data to the receive buffer, and sends an NAK response to the host side to provide notification that the send data was not accepted. After the host side receives the NAK response to confirm that the send data was not accepted, the host side resends the send data. The host repeatedly resends the send data until an ACK response is received.

In this way, even in a USB interface, if the receive buffer of the peripheral device is in a buffer-full state, then receive data cannot be received, so that if, for example, the peripheral device is a printer, then when an error occurs such as being out of paper, there will be a problem in that the peripheral device will not be able to receive a drawer command or a status check command.

Given this, in Japanese Unexamined Patent Application Publication No. H10-333856 a structure is proposed wherein, in a communications terminal, a mode 1 is provided that outputs a busy signal to indicate to the host side that data cannot be processed, and provides a mode 2 that does not output a busy signal and that receives from the host side commands to be processed, where the mode 2 is set for applications that handle commands in real time to thereby enable the handling of a hold state or error state by the host-side application software.

Japanese Unexamined Patent Application Publication No. 2000-207142 identifies the problem that it is not possible for a higher-level device to receive send data that is sent from a printer device when the receive buffer is full when data transmission is performed using the extended capability port (ECP) mode defined in IEEE 1284 in the interface between the higher-level device and the printer, and as a solution to this problem, describes preventing the receive buffer of the printer device from becoming full by the higher-level device not sending the next print data until receiving notification from the printer device of the size that can be received. There is a description of the size that can be received being changed by a specification on the printer device side, to optimize the size that can be received to match the transmission performance of the higher-level device.

In recent years, in POS systems, and the like, communications between the host device and the printer have been performed through a USB instead of the aforementioned RS-232C or IEEE 1284 communications, or the like. In this communication using USB, preventing a memory overflow when the remaining memory of image memory is small through determining the magnitudes of remaining memory and a threshold value when receiving an OUT packet, and responding with an NAK handshake and refusing to receive the data if the remaining memory is smaller than the threshold value is proposed in, for example, Japanese Unexamined Patent Application Publication No. 2005-117422.

Moreover, a structure wherein a buffer-full is prevented in parallel communications control by establishing specific special commands on the printer side and providing on the host side special command processing means when specific error states, established in advance, occur is proposed in, for example, Japanese Unexamined Patent Application Publication No. 2005-18638.

Moreover, Japanese Unexamined Patent Application Publication No. 2001-202322 proposes an interface device for connecting between a host device and a printer device wherein the host device is caused to send data, even if the printer device cannot receive data, if the receive data is a real-time command, and the data is stored to a storage means and sent to the printing device and applied to the receive buffer of the printing device.

In a POS system wherein a control is performed by a host device, typically the structure is one wherein the host device is connected to a printer, and connected through the printer to a variety of data terminals such as a display device, a drawer, a modem, a barcode reader, and so forth, where the data that is sent to the variety of data terminals is first sent from the host device to the printer, and then sent from the printer to the individual data terminals.

Moreover, when, in a POS system that uses serial communications, there is a switch over to communications using a USB from a conventional serial communications port, it is desirable to reduce the costs incurred in the change by having the changes from the existing device structure, used in conventional serial communications, be as small as possible in the structure of the host device side PC and the printer on the terminal device side.

Given such a desire, various approaches, such as described above, have been proposed for the problem of not being able to receive commands to be executed immediately if the communications device side receive buffer is in a buffer-full state in the data communications between the host device and the communications device as described above. However, all of these approaches are handled by having specialty functions on the communications device side, but switching software requires a vast amount of work, and there is also the problem of low general versatility, such as having to prepare an interface device having special functions, as well as the problem of not having a solution that uses the functions that are normally provided in normal communications equipment.

Furthermore, in the structure in Japanese Unexamined Patent Application Publication No. H10-333856, there is a problem in that even though it is necessary to have a mode selecting function on the communications terminal side, this cannot be applied to application software that does not respond in real time.

Additionally, the structure in Japanese Unexamined Patent Application Publication No. 2000-207142 must have a function to detect the size that can be received by the printer device and to transfer to the higher-level device the receivable size that has been detected, and thus it is necessary to incorporate a new function into existing communications devices that do not have this function. Moreover, although it is possible to change the size that can be received, it is necessary for this change to be performed on the printer device side, and thus necessary to incorporate the receivable size change function into the printer device side. There is also a problem in that the change to the receivable size cannot be performed on the higher-level device side.

In the structure in Japanese Unexamined Patent Application Publication No 2005-117422, the reception of image data is refused when the remaining memory is less than a threshold value, and thus there is a problem in that reception of commands requiring real-time execution is also refused, making it impossible to execute real-time execution commands in the communications device.

The structure in Japanese Unexamined Patent Application Publication No. 2005-18638 has a problem in that the host side is provided with specialty command processing means, so it is necessary also to have a function to execute the specialty commands on the printer side as well.

In the structure in Japanese Unexamined Patent Application Publication No. 2001-202322, there is the problem of the need to provide, in the interface device, a function for determining whether the receive data is a received-data real-time command, and the need to provide storage means for storing received-data real-time commands.

As described above, because all of the systems disclosed in the above-described patent literature require major changes, such as adding new devices or functions, to the host side and the communications device side, it is difficult to enable the reception of real-time execution commands when the receive buffer is in a buffer-full state without requiring major changes in the existing host device or communications device.

Because of this, when applying, to the receive buffer-full state, the conventional technology that has been proposed, there is the problem of requiring new structures or functions in the host-side PC or the terminal equipment-side printer.

Consequently, there is the need to be able to receive real-time execution commands, even when the receive buffer is full, in a configuration that uses the existing device structure, without adding new structures or functions to the host-side PC or the terminal equipment-side printer.

SUMMARY OF THE INVENTION

Given this, an object of the present invention is to solve the issues described above, solving the problem of not being able to receive real-time execution commands when the communications device-side receive buffer is in a buffer-full state in data communications between a host device and a communications device, and in particular, it is an object to enable the reception of real-time execution commands, when in a buffer-full state, in a configuration that uses the existing equipment structures without adding new structures or functions to the host-side PC or terminal equipment-side printer.

The present invention can receive real-time execution commands through a communications device when the receive buffer is full by expanding the buffer size of the receive buffer that is provided in the communications equipment based on an instruction sent from the host device side using USB virtual serial communication.

Moreover, because the receive buffer has the structure that is normally provided in communications devices and because it is possible to use control signals that are used for expanding the buffer size of this receive buffer and possible to use instruction signals for flow control that are used in serial communications, it is possible to achieve a structure that uses the existing device structures, without adding new structures or functions to the host equipment-side PC or the terminal equipment-side printer.

In the present invention, there is physically a USB interface through a USB virtual serial driver from the application, which, in operation, is handled as a serial interface, and even flow control such as Xon/Xoff and RTS/CTS can be specified. When a command with high importance, such as a drawer command, is sent, the application can specify no flow control. Because in USB communications ACK/NAK flow control is performed, on the communications device side the specification for no flow control is not actually used in flow control, but by receiving this specification for no flow control it is possible to determine that the content requires sending even if there is a buffer-full state, such as for a drawer command, and the buffer status is changed based on this instruction.

Consequently, in the present invention the specification for no flow control is used not to actually specify serial flow control, but rather is used to differentiate between data that should be accepted and data that should not. More specifically, in a state wherein there is a specification such as to perform Xon/Xoff or RTS/CTS flow control, the buffer status is determined by a specific threshold value, and if it is determined that the buffer is in a state exceeding that threshold value (a "near full" state), then an NAK response is returned. If, in this state, no protocol is specified, then the threshold value is increased, increasing the receivable size, making it possible for the packet data to be received thereafter.

Doing this makes it possible to receive commands with high importance or urgency, such as drawer commands, while maintaining the ACK/NAK flow control standards of the USB interface, even when the buffer is in a state that is judged to be full (the "near-full" state).

The present invention is provided in the respective aspects of a communications device, a communications control method, and a printer provided with a communications device.

The aspect of the present invention that is a communications device is connected to a host device through a USB bus, and is provided with a communications buffer that configures an endpoint of the USB connection, and with a control unit.

The control unit changes the receive buffer size of the receive buffer wherein the communications buffer stores the receive data, based on an instruction that specifies no flow control through USB virtual serial communication from the host device side in the flow control using the serial interface protocol.

The communications buffer is a data storage region provided in advance by the communications device in order to store the communications data, where, in this data storage region, a region for storing the receive data is provided as the receive buffer.

Here the communications data includes, for example, printing data for printing on a printer, commands for controlling the printer and various types of data terminals, and status. As commands there are, along with drawer commands such as "drawer open" to open the drawer, commands for controlling the various operations of the printer, a display device, a modem, a barcode reader, and the like. In addition to commands used for controlling normal operations, these commands include real-time execution commands, which require execution in real time, such as the drawer open command and the clear error command.

The control unit changes the receive buffer size of the receive buffer wherein the communications buffer stores receive data, based on an instruction sent through USB virtual serial communication from the host device side.

This instruction specifies flow control active or inactive when the controlling the flow between the host device and the communications device following the serial interface protocol. The control unit, in this instruction, changes the receive buffer size of the receive buffer based on the specification of active or inactive for the flow control.

When the instruction specifies that flow control is inactive, the receive buffer size of the receive buffer provided in the communications buffer is increased based on this specification, and if the instruction specifies that flow control is active, then control is performed to reduce the receive buffer size of the receive buffer provided in the communications buffer, based on the specification.

Moreover, the communications buffer provides a storage region that includes a plurality of regions that can be separated or linked freely in software, where one of those regions is defined as a receive buffer for storing receive data, and the remaining regions are defined as free regions.

The control unit controls a portion of the plurality of regions as the receive buffer and controls the remaining regions as free regions. In this region control, if a specification is received to turn the flow control inactive, then the receive buffer size is increased by linking the receive buffer and a free region in software to incorporate the free region into the receive buffer. If a specification is received that the flow control is active, then the receive buffer size is decreased by separating, in software, the receive buffer and the free region.

Here the control unit does not write the receive data or read out the data that has been stored for regions that are specified as free regions within the communications buffer. In the present invention, these free regions are buffer regions that are prepared for storing real-time execution commands that are urgent, requiring execution in real time, even when the receive buffer is in a buffer-full state, to thereby avoid a situation wherein the reception of real-time execution commands is not possible because of storing data or commands (hereinafter termed "data," including commands) that do not require real-time execution.

Consequently, the free region is in a state wherein storage is normally not possible in order to not store data aside from real-time execution commands. This free region enables the reception of real-time execution commands by increasing the buffer size of the receive buffer by becoming receive buffers when receiving a real-time execution commands. In the present invention, the specification of flow control inactive is used as the trigger for switching to link the free regions into receive buffers.

The control unit not only turns inactive the flow control that is performed by the USB control, but also increases the buffer size of the receive buffer by linking in software the free regions to the receive buffer, when a specification is received for turning the flow control inactive.

Moreover, when the reception of a real-time execution command has been completed, so that reception by the expanded receive buffer is not required, then a portion of the receive buffer is separated in software to be a free region, thereby reducing the buffer size of the receive buffer, and preparing for the reception of the next real-time execution command. In the present invention, the specification for turning flow control active is used as the trigger for switching to separate the free region from the reception buffer.

The control unit reduces the buffer size of the receive buffer by separating, in software, the free region from the receive buffer, along with restarting the flow control that is performed by USB control, when a specification is received to turn the flow control active.

Moreover, the communications device is provided with an analyzing unit for analyzing stored data that is stored in the receive buffer, and a forwarding unit for forwarding commands that have been analyzed by the analyzing unit. The forwarding unit forwards, to an external device that is connected through the USB interface, commands obtained through the analysis of the analyzing unit. As the external device, various types of data terminals, such as display devices, drawers or modems, barcode readers, or the like, can be used, where the data for the real-time execution commands that is stored in the extended receive buffer is analyzed, and the forwarding unit sends data to a variety of data terminals through the USB interface, so that the real-time execution commands will be performed.

Moreover, the communications device is provided with an analyzing unit for analyzing stored data that is stored in the receive buffer, and provided with a printer buffer. The printer buffer stores printing data that is the result of the analysis by the analyzing unit.

Moreover, the aspect of the present invention that is a method of communications control is a method that controls communications between a host device that is connected with USB connection and a communications device that is the target. The communications device is provided with a communications buffer that structures the endpoint that is connected by USB connection, and the receive buffer size of the receive buffer for storing receive data, provided in the communications buffer is changed based on an instruction that is sent to the communications device from a host device.

The instruction is a specification to establish the flow control between the host device and the communications device as either active or inactive, where the communications device receives a specification from the host device to turn the flow control inactive, and thus increases the receive buffer size, or decreases the receive buffer size with a specification from the host device to turn the flow control active.

Moreover, the communications buffer is provided with a storage region including a plurality of regions that can be linked or separated freely in software. A portion of the plurality of regions is defined as the receive buffer, and the remaining regions are defined as free regions, where the receive buffer size is expanded by linking the receive buffer and a free region in software to incorporate the free region into the receive buffer, or the receive buffer size is decreased by separating, in software, the receive buffer and the free region.

The proportions in the plurality of regions provided in the communications buffer can be set according to a specification from the communications device side. Moreover, the free regions are structured including a plurality of regions, where any number of regions selected from this plurality of regions can be linked to the receive buffer to selectively expand the receive buffer size.

Moreover, the present invention can be embodied in the aspect of a printer provided with a communications device according to the present invention. This printer is provided with an analyzing unit for analyzing stored data that is stored in the receive buffer, a printer mechanism for performing printing, and a printer buffer for storing print data used in the printing of the aforementioned printer mechanism. The control unit stores print data, obtained from the analyzing unit, into the printer buffer, and drives and controls the printer mechanism using commands obtained from the analyzing unit.

Through the use of USB virtual serial communication, the present invention is able to send instructions specifying flow control active or inactive through a serial interface protocol, even if there is only a USB interface provided, with no serial interface, where the receive buffer size can be changed by the specification of flow control active/inactive.

The communications device, method for communications control, and printer provided with a communications device as set forth in the present invention can receive real-time execution commands in data communications between the host device and the communications device even if the receive buffer on the communications device side is full.

In particular, this enables the reception of real-time execution commands when the receive buffer is full, using the existing device configuration without the addition of new structures or functions to the PC on the host device side or the printer on the terminal device side.

BRIEF DESCRIPTION OF THE DRAWINGS

FIG. 3 is a diagram for explaining the change in the buffer size of the receive buffer in the present invention;

FIG. 4 is an operating diagram for explaining the communications operations from a host device to a communications device according to the present invention;

FIG. 12 is a diagram for explaining the communication states between a host and a peripheral device using a USB interface.

DESCRIPTION OF THE PREFERRED EMBODIMENTS

The communications device aspect of the present invention will be explained first.

Figure 1:
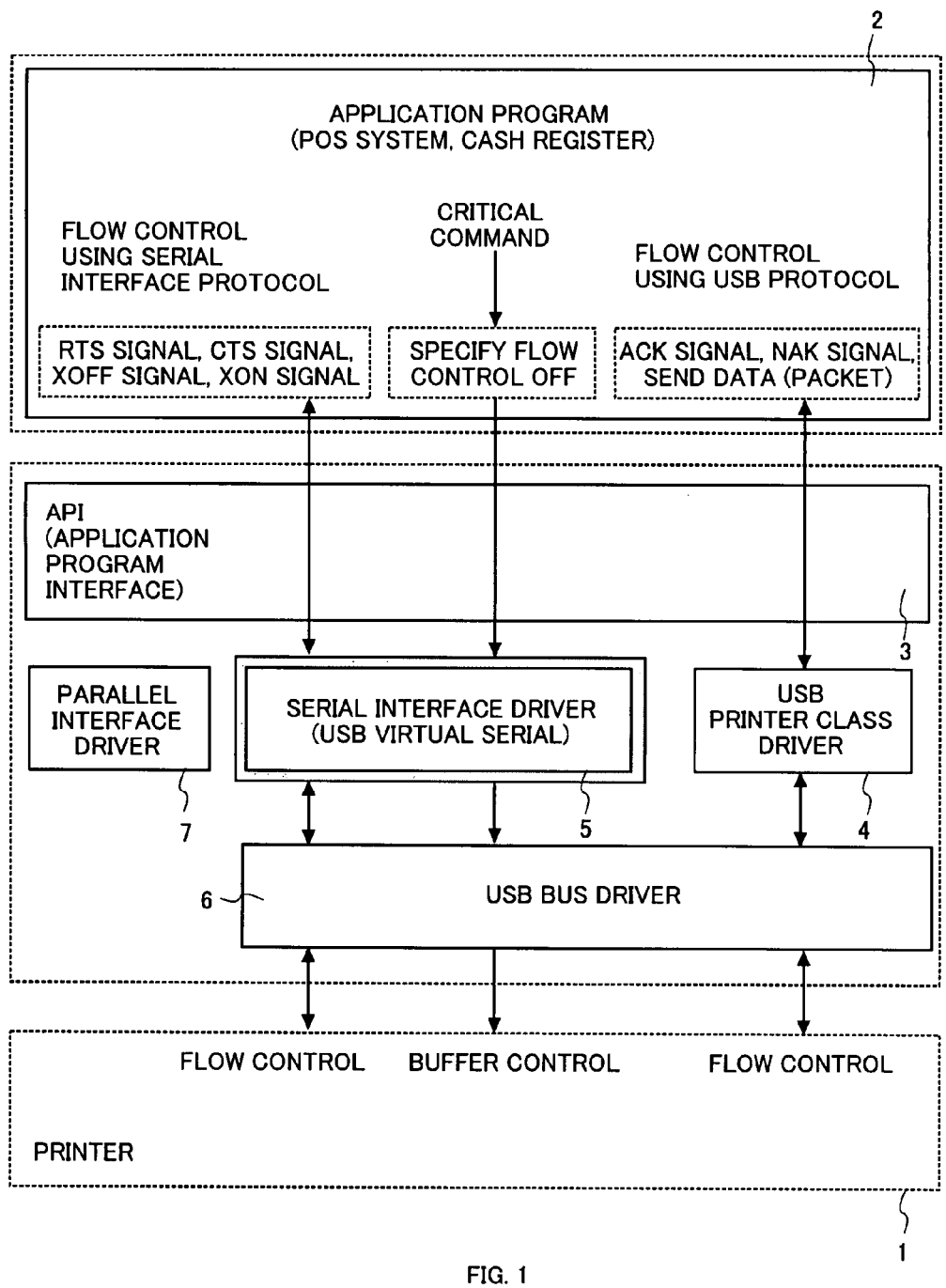
FIG. 1 is a diagram for explaining the relationship between a host device and a communications device that are connected with USB connection according to the present invention.

FIG. 1 is a diagram for explaining the relationship between the host device and the communications device that are connected with USB connection through the present invention.

In FIG. 1, the host device is provided with an application program 2, an application program interface 3, and drivers 4 through 7, and presents an example of a printer as a communications device, where the host device and the printer are connected through a USB interface.

The application program 2 is a program relating to, for example, a POS system or a cash register, or the like. This program is provided with a program for performing flow control using the serial protocol that is a conventional program resource, in addition to having a program that performs flow control using a USB protocol for sending and receiving signals via a USB.

The application program 2 connects to a USB bus driver 6 through a USB printer class driver 4 using flow control through the USB protocol to communicate with the printer 1 through the USB interface. This communications through the USB interface sends the send data in the aspect of packets, along with sending ACK signals and NAK signals.

Moreover, the application program 2 connects to the USB bus driver 6 through a serial interface driver 5 that structures the USB virtual serial driver, through flow control using the serial protocol, to connect to the printer 1 through the USB interface. In this communication using the USB interface, the application program 2 side can perform flow control through a serial protocol using the RTS signal and CTS signal, or using the Xoff signal and Xon signal, through having the serial interface driver 5 be a USB virtual serial driver.

When the virtual serial driver receives data that is sent from the application to the serial port, the data is not sent to a physical serial port, such as an RS-232, but rather is sent to the USB interface. Moreover, the virtual serial driver passes data to the application as if received from the serial interface, even if the data was received from the USB interface. Doing this enables applications for serial interfaces to communicate with USB printers, and the like, without being aware of the USB.

At this time, in order for the USB interface to operate virtually as a serial interface, the serial interface driver is changed to be a USB virtual serial communication. This enables the myriad applications of the past that use legacy interfaces to operate on new computers as well, by merely changing the device driver, without changing the applications themselves.

The present invention, in the configuration described above, is able to receive commands through changing the capacity of the receive buffer based on a specification that is sent through the USB virtual serial driver to specify the flow control inactive in the serial interface protocol for commands with high importance levels such as a cash register drawer open command, even when signals are not received in flow control by the USB protocol because the capacity of the receive buffer is in a full state.

Figure 2:
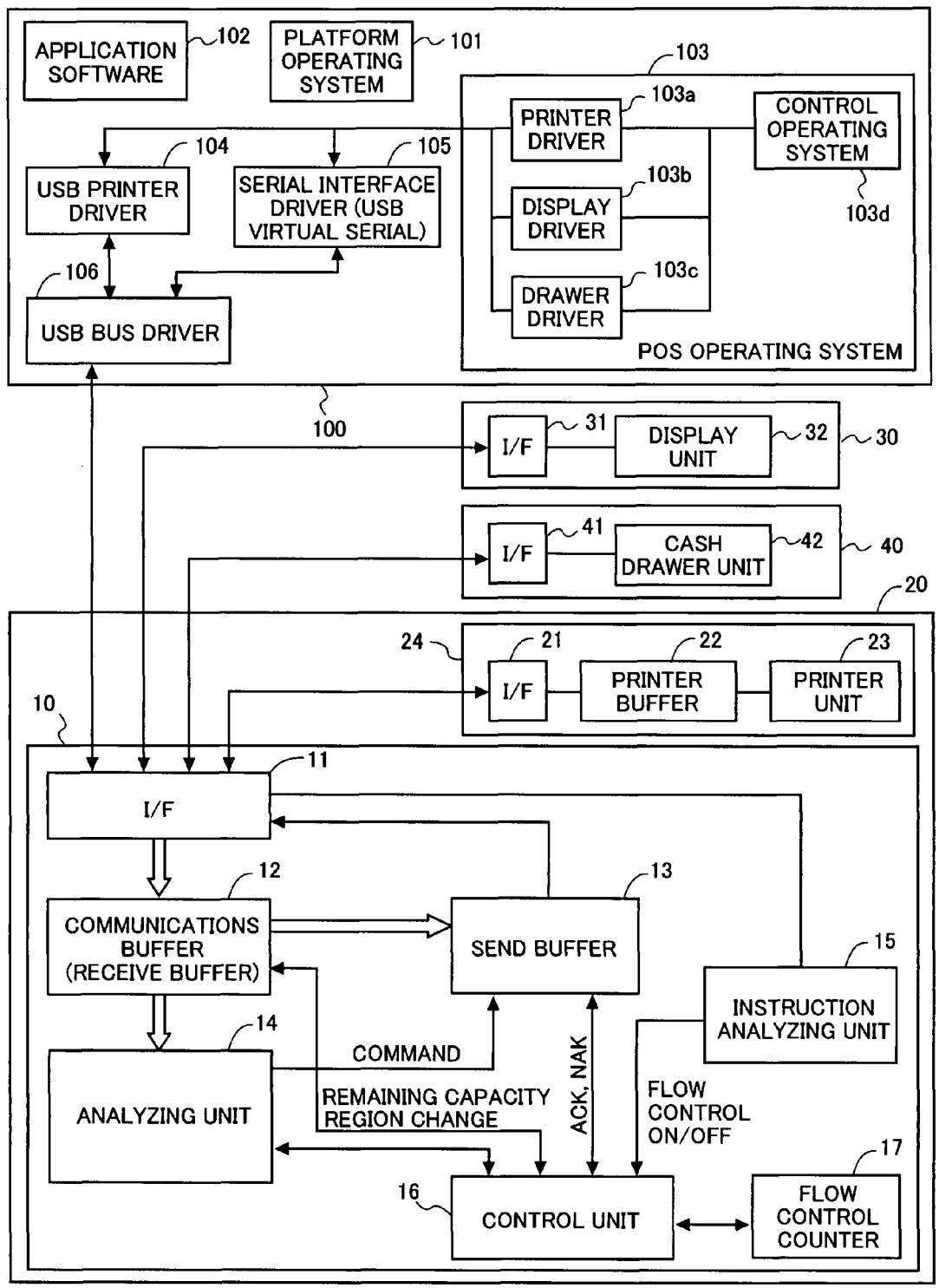
FIG. 2 is a diagram for explaining the relationship between a host device and a communications device that are connected with USB connection according to the present invention, and for explaining the schematic structure of the communications device.

FIG. 2 is a diagram for explaining the relationship between the host device and the communications device through a USB connection as set forth in the present invention, and to explain the schematic structure of the communications device.

FIG. 2 shows an example of structuring a POS system by connecting a host device 100 and a communications device 10 through a universal serial bus (USB). The USB is a serial interface for sequentially sending data one bit at a time using a single pair of signal lines, where communication is performed between a buffer in a host and an endpoint buffer in a device using packet units, where communication is enabled through polling the periphery devices connected to the host device.

FIG. 2 shows an example wherein the communications device 10 is connected to the host device 100 through a USB interface, and where, on the downstream side of the communications device 10, peripheral devices (20 through 40) are also connected. Note that the target peripheral devices are not connected together through USB interfaces, but rather the communications device 10 is connected to the peripheral devices 20 through 40 to connect the peripheral devices through a hub.

FIG. 2 shows an example wherein a printer 20, a display device 30, and a cash drawer 40 are connected to the communications device 10 as peripheral devices. Note that this shows an example of structuring a POS system incorporating the function of the communications device 10 into an existing printer 20, as a structure that incorporates the communications device 10 into the printer 20.

In this structure, the USB bus driver at 106 of the host device 100 is connected to a communications interface port 11 of the communications device 10 through the USB interface, and this communications interface port 11 is connected physically to the printer 20, the display device 30, and the cash drawer 40 through the USB interface.

Moreover, within the printer 20, the communications device 10 and the printer mechanism 24 for performing the printing, which includes a printer interface 21, a printer buffer 22, and a printer unit 23, are physically connected through the USB interface.

When printing, the host device 100 sends print data to the communications device 10, and the print data received by the communications device 10 is forwarded to the printer buffer 22. The printer unit 23 processes the print data written to the printer buffer 22 to perform the printing.

When displaying on the display device 30, the host device 100 sends display data to the communications device 10, and the communications device 10 forwards the received display data to the display unit 32. The display unit 32 performs the display operations using the display data that has been forwarded.

Moreover, for the cash drawer 40, when the drawer is to be opened, for example, the host device 100 sends a drawer open command to the communications device 10, and the communications device 10 forwards the received drawer open command to a cash drawer unit 42. The cash drawer unit 42 uses the forwarded drawer open command to open the drawer.

In addition to the USB bus driver 106 that is connected to the USB signal lines, the host device 100 is also provided with an operating system (OS) 103 for a POS, devices that are typically provided for the host device 100, such as a keyboard and a display, application software 102 for controlling these devices, a platform operating system (OS) 101, and the like. The application software 102 can be various types of application software in addition to the application software for the POS, and runs under the control of the platform operating system 101 and the POS operating system 103.

Moreover, the POS operating system 103 is provided with a printer driver 103a, a display driver 103b, a drawer driver 103c, and a control operating system 103d for controlling these drivers.

The signals for flow control (the ACK signal and the NAK signal) in the USB protocol and the send data in the host device 100 are sent to the communications device 10 through the USB interface through the USB bus driver 106 from the USB printer driver 104.

Furthermore, the signals relating to flow control (the RTS signal and CTS signal or the Xoff signal and Xon signal) in the serial interface protocol, and the flow control active/inactive specification, by the application program in the host device 100 are sent from the serial interface driver 105, which structures a USB virtual serial driver, through the USB bus driver 106 to the communications device 10 through the USB interface. At this time, flow control is performed by the USB protocol from the USB bus driver 106 forward, but the application program is able to handle the flow control in the same manner as when performing flow control using the serial interface protocol.

The communications device 10 is connected to the host device 100 through a communications interface port 11 with the USB interface. The communications interface port 11 is provided with a receive buffer 12 and a send buffer 13. The receive buffer 12 receives and stores data sent from the host device 100, and data sent from peripheral devices such as the printer mechanism 24, the display device 30, the cash drawer 40, and the like.

On the other hand, the send buffer 13 performs storage for sending to the various peripheral devices the data that is sent from the host device 100, or for sending to the host device 100 the data that is sent from the various peripheral devices. Here the data that is stored in the receive buffer 12 and the send buffer 13 is not limited to print data, but also includes commands, and when it comes to non-command data, is not limited to print data, but may also include data of a variety of contents, such as image data.

In addition to the aforementioned communications buffer 12 and send buffer 13, the communications device 10 is also provided with an analyzing unit 14 for analyzing the receive data received by the receive buffer of the communications buffer 12 to extract the data of the various types of content, such as print data, and the various types of commands that are included in the receive data.

Moreover, the communications buffer 12 that is provided in the communications device 10 as set forth in the present invention is provided with a plurality of regions that can be linked or separated freely, where one region of this plurality of regions is defined as the receive buffer to store receive data that is received, while the remaining regions are defined as free regions that do not store receive data. These free regions store receive data by being switched into receive buffers through an instruction from the host device 100 specifying flow control. The switching of the free regions into receive buffers enables the reception of data with high importance, such as real-time execution commands, even when the receive buffer is in a buffer-full state, doing so through expanding the buffer size of the receive buffer.

Note that the changing of the buffer size of the receive buffer includes not only expanding through switching the free regions into receive buffers, as described above, but also includes reducing through returning these switched receive buffers into free regions.

In the communications device 10, the changing of the buffer size, that is, the expansion of the buffer size by switching the free regions within the communications buffer 12 into receive buffers, and the reduction of the buffer size performed through returning the receive buffers into free regions, can be performed based on instructions from the host device 100, as described above. The communications device 10 is provided with an instruction analyzing unit 15 for receiving and analyzing instructions that specify the flow control from the host device 100.

Here the changing of the buffer size of the receive buffer in the communications buffer is performed based on instructions specifying the flow control sent to the communications device 10 from the host device 100.

In the present invention, the flow control includes two types of flow control: flow control by the USB interface, and flow control by a serial interface. These types of flow control are that which perform communications between the host and the peripheral devices by procedures following specific protocols; however, the flow control by the serial interface is used not only in conventional flow control, but also in control of switching the capacity of the receive buffer.

Between the host device 100 and the communications device 10 in the present invention, communications are performed between the host and the peripheral devices using flow control. At this time, the host device 100 sends an instruction to the communications device 10 specifying flow control inactive in the serial interface when sending a command with high importance or urgency. This specification to turn flow control inactive is sent from the USB bus driver through the USB virtual serial driver. When the communications device 10 receives the instruction to turn the flow control inactive, the buffer capacity is switched, through, for example, switching a threshold value, as sending a command with high importance or urgency.

Note that the instruction for turning the flow control inactive is flow control in the serial interface, and not flow control in the USB interface, so ACK and NAK responses are continued by the USB interface.

Moreover, when returning the switched buffer capacity to the original capacity, there is an instruction from the host device 100, for example, to the communications device 10 specifying that flow control be turned active. When the communications device 10 receives the instruction to turn the flow control active, the buffer capacity is returned to normal through, for example, switching a threshold value.

The communications device 10 as set forth in the present invention changes the buffer size of the receive buffer in the communications buffer based on an instruction specifying that the flow control in the serial interface be turned inactive or active. For example, by specifying that the flow control be turned inactive, the free regions are switched into receive buffers to increase the buffer size of the receive buffer, and by specifying that the flow control be turned active, these switched receive buffers are returned to free regions to decrease the buffer size of the receive buffer. Note that the flow control specification status can be stored in a flow control counter 17.

The communications device 10 is provided with a control unit 16. The control unit 16 not only performs flow control, but also performs buffer control for increasing the buffer size of the receive buffer when the receive buffer is in a buffer-full state, or performing buffer control to reduce the buffer size of the receive buffer. At this time, the control unit 16 gets the capacity of the data that is stored in the receive buffer from the communications buffer 12, or gets data on the remaining volume of data that can be stored in the receive buffer 12, and sends the ACK and NAK responses.

The control unit 16 sends to the send buffer 13 data that is stored in the receive buffer in the communications buffer 12 based on the results of analysis by the analyzing unit 14, and also controls the sending to the peripheral devices and the host device from the send buffer 13 through the communications interface port 11. Moreover, the control unit 16 also controls the forwarding of the ACK responses and NAK responses to the send buffer 13 based on the receive buffer receptions status, and controls the sending from the send buffer 13 to the host device through the communications interface port 11.

The changing of the buffer size of the receive buffer will be explained next using FIG. 3.

FIG. 3A shows the relationship between the receive buffer and the free regions in the communications buffer. The communications buffer is a storage region prepared for storing receive data in storage means provided in the communications device, where the volume of data that can be stored in the storage region is not only determined by a threshold that determines whether or not data will be stored, but can also be set by setting an address in the storage region. The maximum value of the buffer size of the receive buffer can be determined by this threshold value or by an address setting.

This threshold value establishes the maximum value of the buffer size of the receive buffer, and the volume of the data that is stored is compared to this threshold value, and when the volume of the data that has already been stored is at the threshold value, then when the data volume of the new data to be stored in addition to the volume of the data that has already been stored exceeds the threshold value, then it is determined that the buffer is in a full state or will fall into a full state. Moreover, this threshold value can be expressed by an address.

This communications buffer can be divided virtually into a receive buffer for storing receive data and a plurality of regions that are free regions that do not store receive data. The receive buffer stores send data that is sent from the host device, and then receives the data. In flow control, if there is an ACK response, then the send data that is in the receive buffer is received. The free regions are regions wherein data is not stored in flow control, and are regions that are provided for receiving data and commands with high necessity such as real-time execution commands in a state wherein it has been determined that the receive buffer is full. The proportions of the capacities of the receive buffer and the free regions can be determined in advance by a threshold value or by an address setting.

FIG. 3B and FIG. 3C show the case wherein the buffer size of the receive buffer is increased. In FIG. 3B, the receive buffer stores the received send data as stored data, where the part that remains without send data stored is free buffer. The volume of data stored in the receive buffer, or the volume of free buffer, can be calculated by, for example, comparing the stored data to a threshold value or referencing the address of the stored data. This data volume calculation for the stored data can be calculated by adding the data volumes of the various stored data even when the stored data is not stored continuously within the receive buffer.

The storage regions as set as free regions do not store data. Note that the data status in the free regions is not necessarily that data is not stored, but rather there may be cases wherein previously stored data may remain from the history of changes within the receive buffer. In such a case, that data within the stored data that may be erased is always ignored.

If, in the state shown in FIG. 3B, the communications device receives an instruction specifying flow control inactive, then, at the time of this instruction, the free regions settings are turned inactive, switching the free regions to receive buffers. FIG. 3C shows the state, where the free buffer portion is increased by switching the free regions into receive buffers, making it possible to store in the free buffer receive data of a size that is greater than the state in FIG. 3B. Note that switching from free regions to receive buffers can be performed by changing the setting for the address in the memory region.

On the other hand, FIG. 3D and FIG. 3E show the case wherein the buffer size of the receive buffer is reduced. In FIG. 3D the entirety of the communications buffer is receive buffer, and there is no free region set. Here data is not stored in the receive buffer, so an estate a shown.

In this state in FIG. 3D, when an instruction to turn flow control active is received by the communications device, this instruction is used as the opportunity to turn active the setting for the free regions, switching a portion of the receive buffer to free regions. FIG. 3E shows this state, where the free buffer portion can be reduced by switching a portion of the receive buffer to free regions. Note that the process for switching the portion of the receive buffer into free regions can be performed by changing a threshold value or by changing the setting for the address in the storage region. As is shown in FIG. 3E after changing to a structure wherein the communications buffer is provided with a receive buffer and free regions, the send data is stored only in the receive buffer following flow control, and is not stored in free regions.

Figure 5:
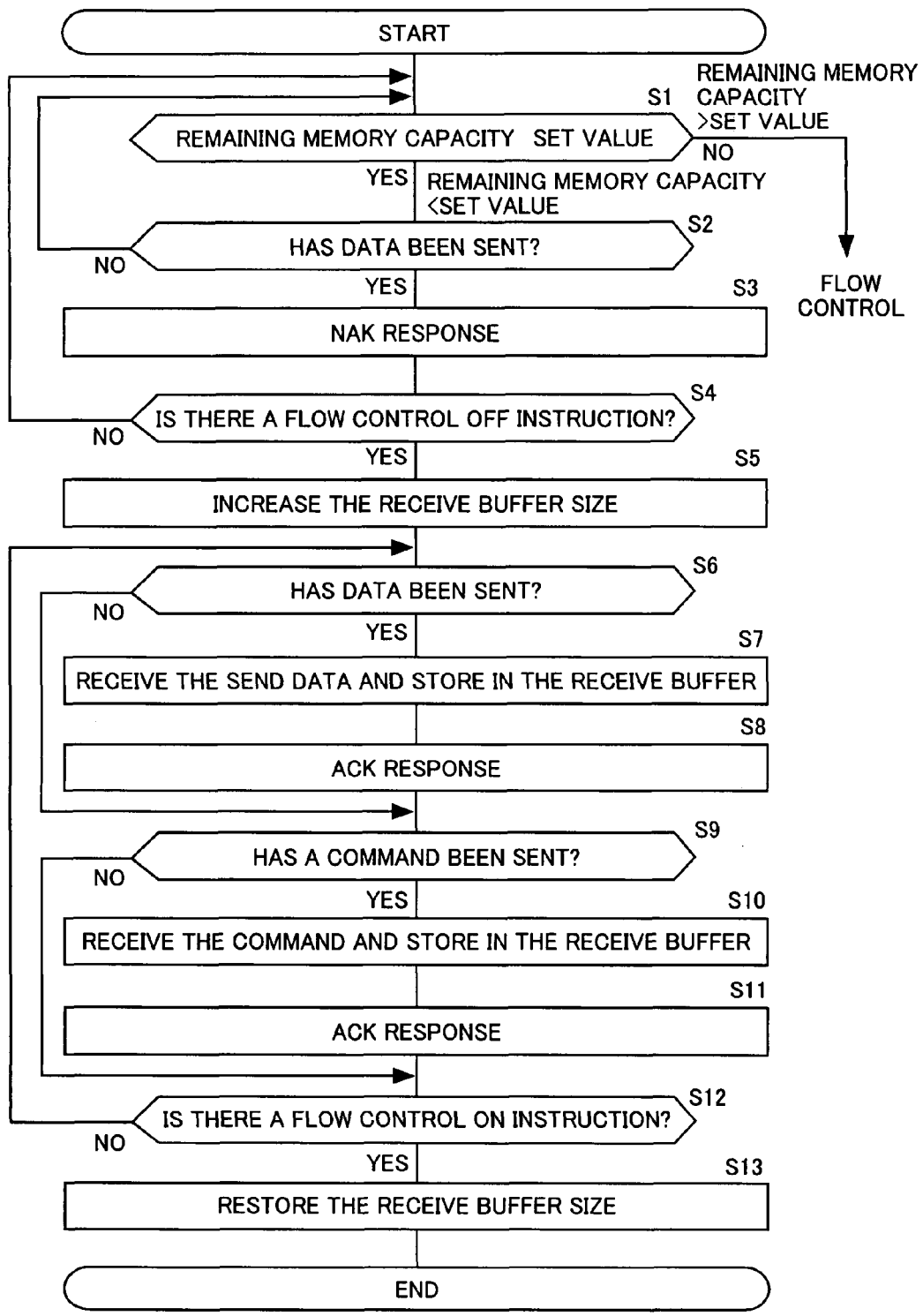
FIG. 5 is a flowchart for explaining the communications operations from a host device to a communications device according to the present invention.
Figure 6:
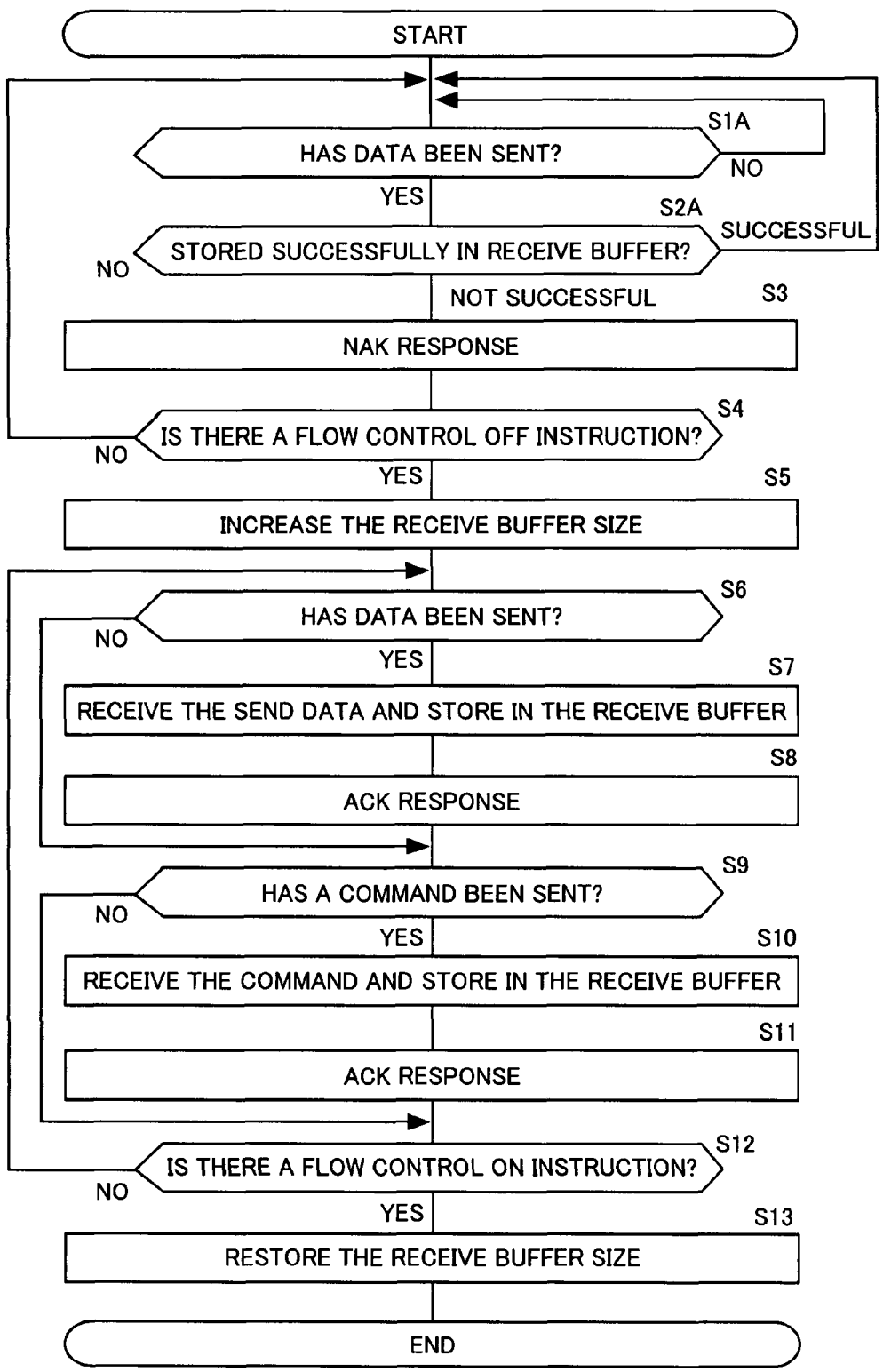
FIG. 6 is a flowchart for explaining the communications operations from a host device to a communications device according to the present invention.
Figure 7:
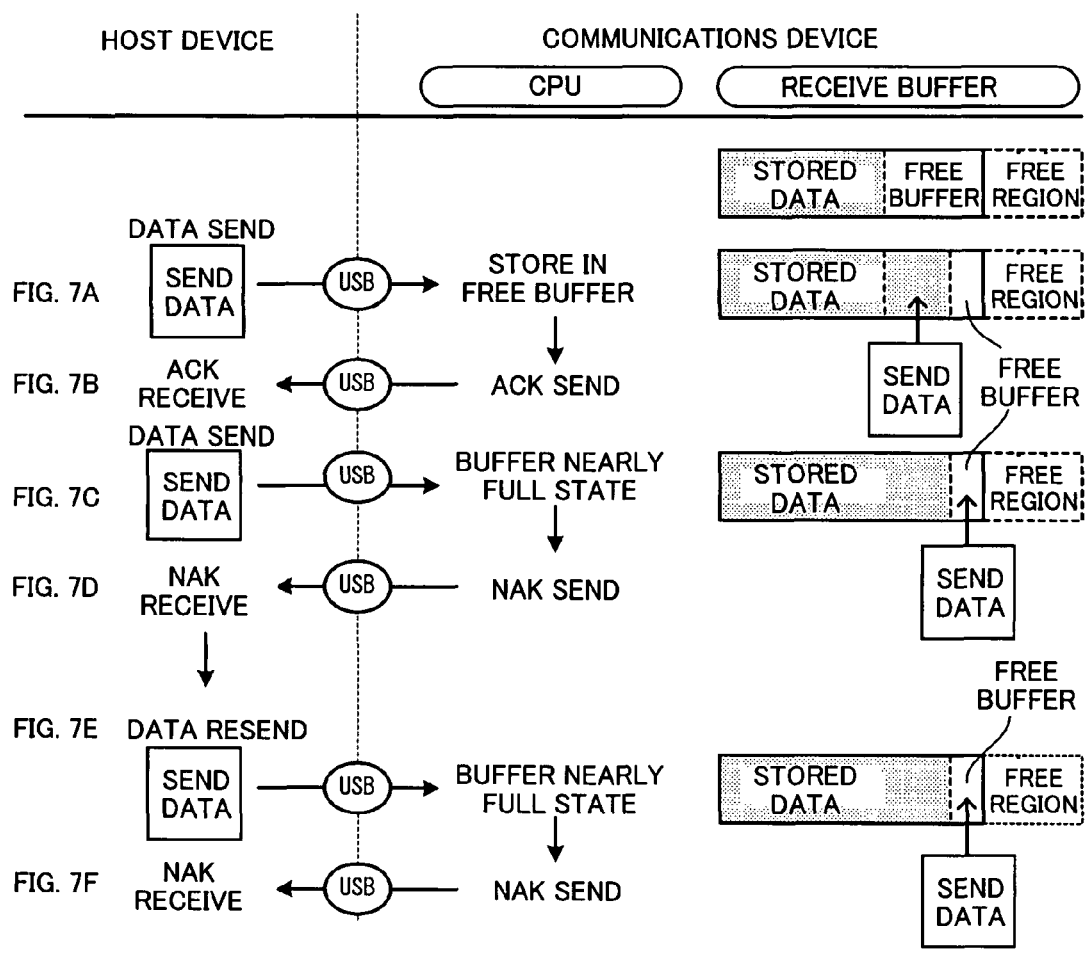
FIG. 7 is a operating state diagram for explaining the communications operations from a host device to a communications device according to the present invention.
Figure 8:
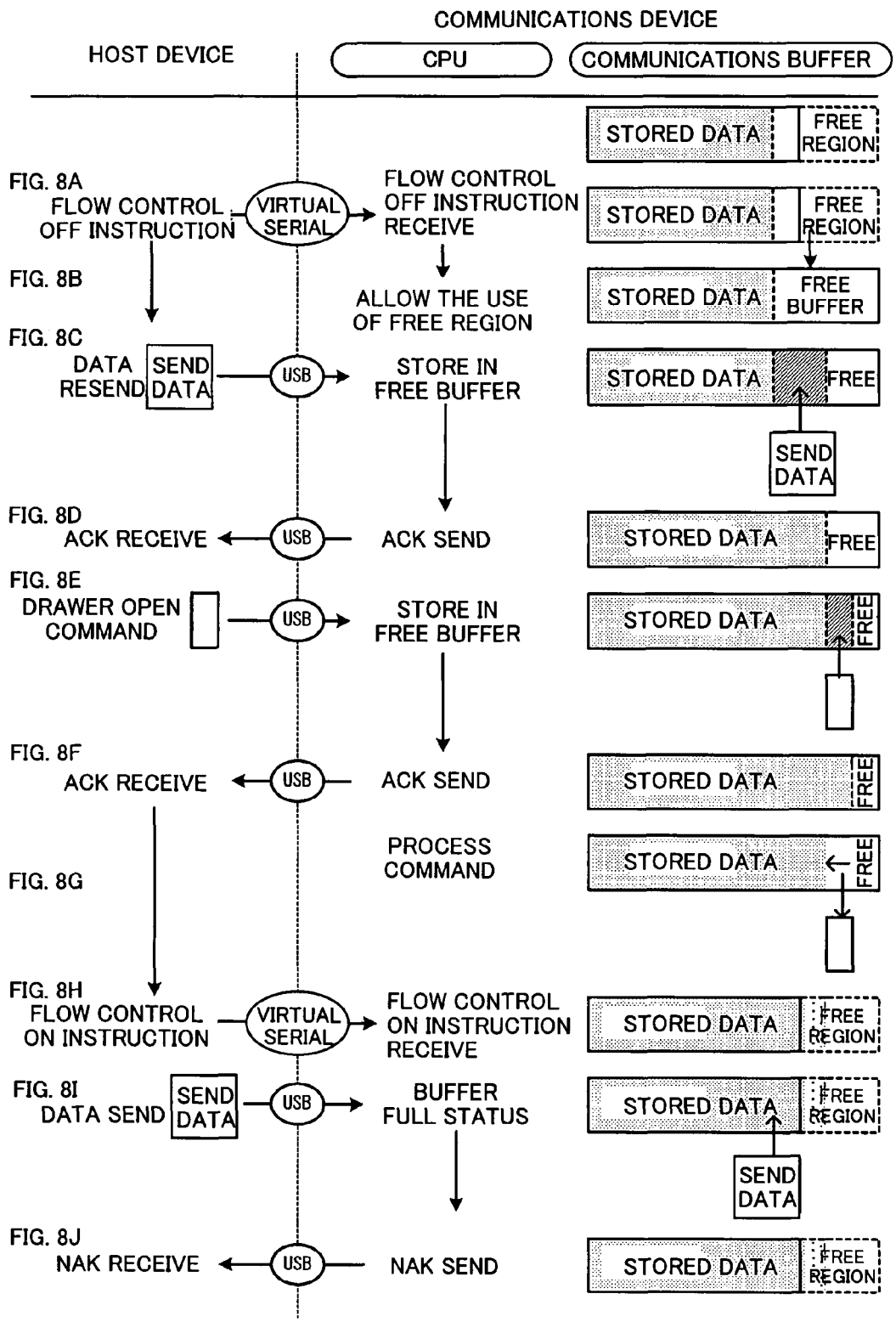
FIG. 8 is a operating state diagram for explaining the communications operations from a host device to a communications device according to the present invention.

Next FIG. 4 shows an operating diagram and FIG. 5 and FIG. 6 show flowcharts of the communications operations between the host device and the communications device, and the state diagrams of FIG. 7 and FIG. 8 will be used for an explanation thereof. Note that the flowcharts in FIG. 5 and FIG. 6 differ in the sequence for checking whether or not new data can be stored in the receive buffer; however, thereafter the operations, including changing the buffer size of the receive buffer, are identical, and so FIG. 5 will be used primarily in the explanation. Moreover, the state diagram in FIG. 7 is for the state wherein flow control is active, and shows the operation wherein the buffer size of the receive buffer is not changed, where FIG. 8 shows the operation wherein the buffer size of the receive buffer is changed.

In FIG. 4, flow control using the USB interface and flow control using a serial interface using virtual serial communication are performed between the host device and the communications device, and buffer control through an instruction specifying that the flow control used in virtual serial communication be turned inactive is performed as well.

FIG. 4A shows an overview of flow control using the USB interface. Here the send data is sent in packets through the USB driver and, if the data can be received in the communications device on the receiving side, the send data is stored in the buffer and an ACK signal is sent to the host device. In the communications device on the receiving side, if reception is not possible due to, for example, a state wherein the buffer is full, then the send data is not stored in the buffer, and an NAK signal is sent to the host device.

Moreover, FIG. 4B shows an overview of flow control using a serial interface using virtual serial communication. Here it is assumed that flow control is specified to be active. When a CTS status query is generated in the application, the host device sends an RTS signal to the communications device through the USB bus driver with a USB virtual serial driver as the serial interface driver. The communications device receives this RTS signal and sends a CTS signal indicating either a ready state or a busy state.

Moreover, when a command with high necessity, such as a cash drawer command is issued by the application, the host device specifies that flow control be turned inactive in the flow control in the serial interface, and this specification is sent to the communications device through the USB bus driver from the USB virtual serial driver of the serial interface driver. The communications device receives the specification for turning inactive the flow control, and changes the capacity of the buffer.

Consequently, three types of control, namely USB flow control through the USB interface, virtual serial control through the USB virtual serial driver, and buffer control by specifying serial flow control, are performed between the host device and the communications device.

In the flowchart of FIG. 5, first a check is performed as to whether or not it is possible to store new data in the receive buffer. This check is performed by comparing the remaining memory capacity in the receive buffer to a threshold value (set value) set in advance. If the remaining memory capacity is greater than the threshold value (set value), then it is determined that it is possible to store data into the receive buffer, but if the remaining memory capacity is less than the threshold value (set value), then it is determined that it is not possible to store data into the receive buffer.

In the storage region in the storage device, the remaining memory capacity of the receive buffer can be calculated from the addresses comprising the receive buffer and the addresses of the data stored in the receive buffer. Additionally, the threshold value (set value) can be set as desired by, for example, adding a specific margin to the volume of data that wherein the send data that is sent in a normal state can be stored, or by setting a percentage ratio relative to the buffer size of the receive buffer (S1).

In the process in S1, if the remaining memory capacity is greater than the threshold value (set value) then data can be stored within the receive buffer, and thus send data that is sent with flow control can be received.

FIG. 7 shows the state of data sending when the remaining memory capacity is greater than the threshold value (set value). In the state diagram in FIG. 7, the communications device stores within the free buffer the send data that was sent from the host device (FIG. 7A) and replies with an ACK (FIG. 7B). The free buffer is reduced by storage of the send data into the receive buffer, causing the receive buffer to become the nearer to a buffer-full state. In this state, when send data is again sent from the host device (FIG. 7C), the send data cannot be stored within the free buffer, and so the communications device sends an NAK response to the host device (FIG. 7D). This state is repeated until the buffer-full state in the receive buffer is resolved and the free buffer is increased (FIG. 7E, FIG. 7F).

On the other hand, if the remaining memory capacity is less than the threshold value (set value), then it is not possible to store data into the receive buffer, and so when data is sent from the host device (S2), the buffer size of the receive buffer is increased by the processes in S3 through S13, below, and the send data is received.

Moreover, in the flowchart in FIG. 6 a check is performed as to whether or not new data can be stored in the receive buffer, and if data is sent from the host device (S1A), this is performed based on whether or not the data storage in the receive buffer was successful (S2A).

If it is determined through the processes in S1 and S2, or the processes in S1A and S2A that the storing of new data would be difficult because the remaining memory capacity in the receive buffer is running out, then the buffer size of the receive buffer is increased by the processes in S3 through S13, and the send data is received.

Because the remaining memory capacity in the receive buffer is running out so that it would be difficult to store new data, the communications device sends to the host device an NAK response in the flow control (S3). The host device receives the NAK response and sends to the communications device an instruction to turn off the flow control. When the communications device receives, from the host device, the instruction to turn off the flow control (S4), the buffer size of the receive buffer is increased (S5).

After the buffer size of the receive buffer has been increased, then when send data is sent from the host device (S6), the communications device stores the send data within the expanded receive buffer (S7). The communications device sends an ACK response. Note that here the flow control is turned inactive, and so it is not necessarily necessary to send the ACK response (S8).

Next, when a command is sent from the host device (S9), the communications device stores the command that has been sent into the expanded receive buffer (S10), and the communications device sends an ACK response (S11).

By sending data or commands that require real-time execution, as send data or commands, the host device is able to execute in real time, even if the receive buffer is in a buffer-full state. Note that the communications device is unable to judge whether or not the data or command that has been sent requires real-time execution, but rather the judgment as to whether or not real-time execution is required is performed on the host device side. Consequently, types of data and commands that require real-time execution are established in advance, for example, on the host device side, and when there is a request from an application for data or a command requiring real-time execution, providing an instruction specifying that flow control be turned inactive, to thereby increase the buffer size of the receive buffer, enables the reception of real-time execution data and real-time execution commands.

Thereafter, when an instruction specifying that flow control be turned active is received from the host device (S12), the communications device returns the buffer size of the receive buffer to the original size based on this instruction by forming free regions within the communications buffer (S13).

FIG. 8 shows the state of operations when changing the buffer size of the receive buffer. In FIG. 8, the receive buffer and free regions are specified in the communications buffer, and the receive buffer stores data in a portion of the region, with free buffer remaining.

When an instruction for turning the flow control inactive is received from the host device (FIG. 8A), the communications device expands the buffer size of the receive buffer by using free regions as receive buffers (FIG. 8B). Thereafter, when send data is sent from the host device, the communications device stores the send data in the free buffer of the expanded receive buffer (FIG. 8C), and an ACK response is returned (FIG. 8D).

Furthermore, when a command such as, for example, a drawer open command is sent from the host device, the communications device stores the command in free buffer in the receive buffer (FIG. 8E) and returns an ACK response (FIG. 8F).

When the data that is stored in the receive buffer is processed, the region of the data for which processing has region within the receive buffer. Note that at this time it is not necessarily necessary to the erase the data for which been completed becomes free buffer, increasing the free buffer processing has been completed within the receive buffer, but instead this may be handled simply by a process that changes an address that indicates the free buffer. In this case, if data is stored in the free buffer, the old data is cleared by the overwriting process (FIG. 8G).

Thereafter, when an instruction that flow control is active is received from the host device, the communications device again sets the free regions within the communications buffer, to reduce the buffer size of the receive buffer. The setting of the free region need not necessarily be the same address region as the free region that had been set initially, but rather any address region may be set to obtain the same free region as a free region that is set in advance.

Moreover, the region that is set for the free region sets with priority a region within the free buffer of the communications buffer. At this time, it is not necessarily necessary to erase data that remains within the free buffer, but rather the old data may be cleared by erasing the data or by an overwriting process when the free region is again changed into the receive buffer.

Moreover, if the capacities of the regions specified as free regions are inadequate with the capacities of only the free buffer regions within the communications buffer, then only the free buffer is set to be free regions. Note that when free regions are set by the regions of only the free buffer, then the capacity of the free regions that have been set will be less than the capacity of the free regions set in advance, and thus when more free buffer is generated through data processing thereafter, this free buffer is set to be a free region, making it possible to secure the free region capacity that was set initially.

Moreover, while a region of a portion of the region wherein data is stored within the receive buffer may be set as a region for securing an amount of capacity equal to the deficient free region, at such a time there would be the risk of a portion of the stored data becoming unusable.

When in a state wherein the receive buffer is in a buffer-full state after the free region has been set by an instruction that the flow control is active, then when send data is sent from the host device (FIG. 8I), the communications device responds with an NAK response (FIG. 8J).

If, when in this state, the host device is to send data requiring real-time performance, such as a real-time execution command, then an instruction to turn flow control inactive, as shown in (FIG. 8A), above, is sent prior to sending the real-time execution command, to thereby increase the buffer size of the receive buffer in the communications buffer on the communications device side, to secure capacity for receiving the real-time execution command.

Figure 9:
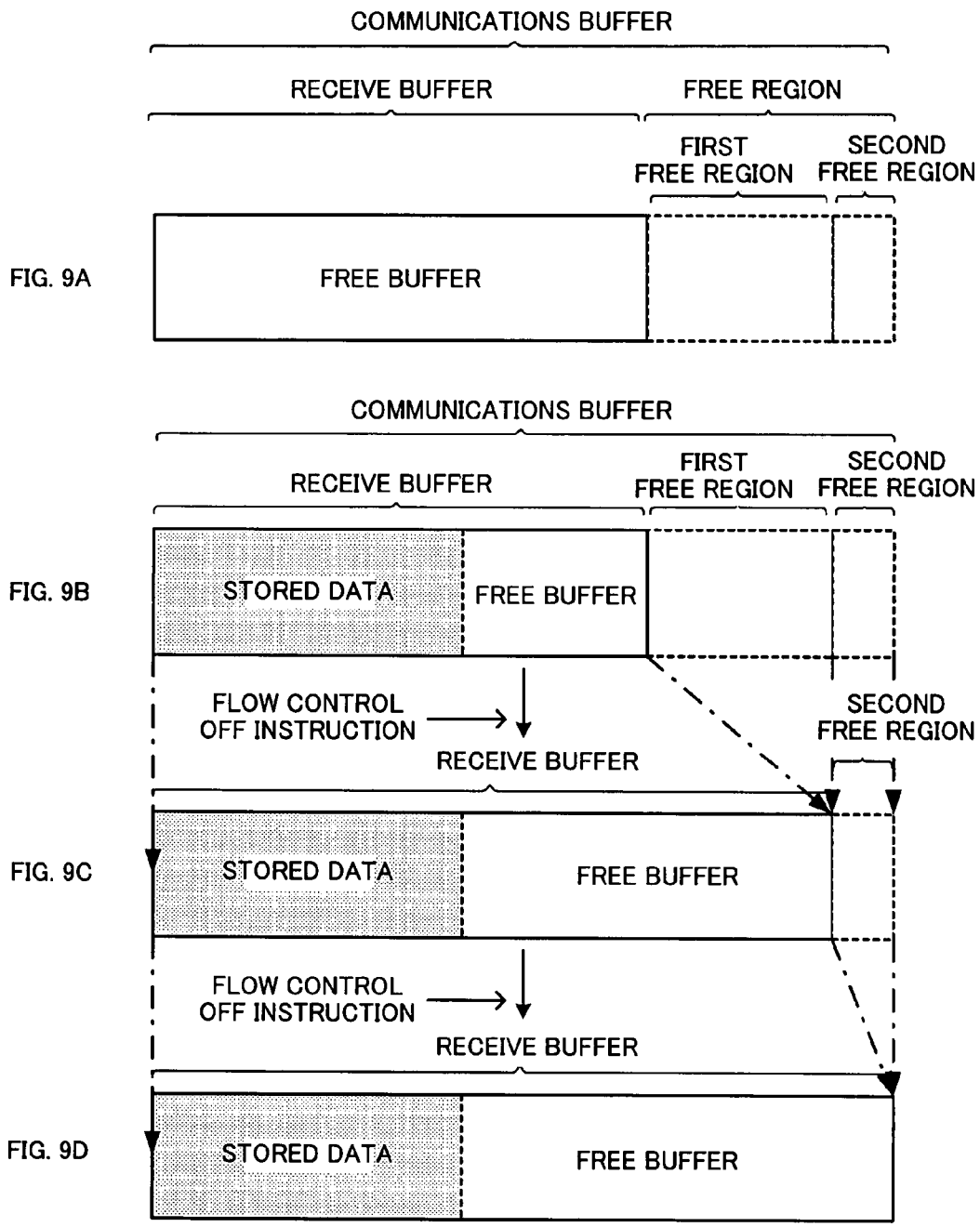
FIG. 9 is a figure for explaining a free region having a plurality of free regions according to the present invention.
Figure 10:
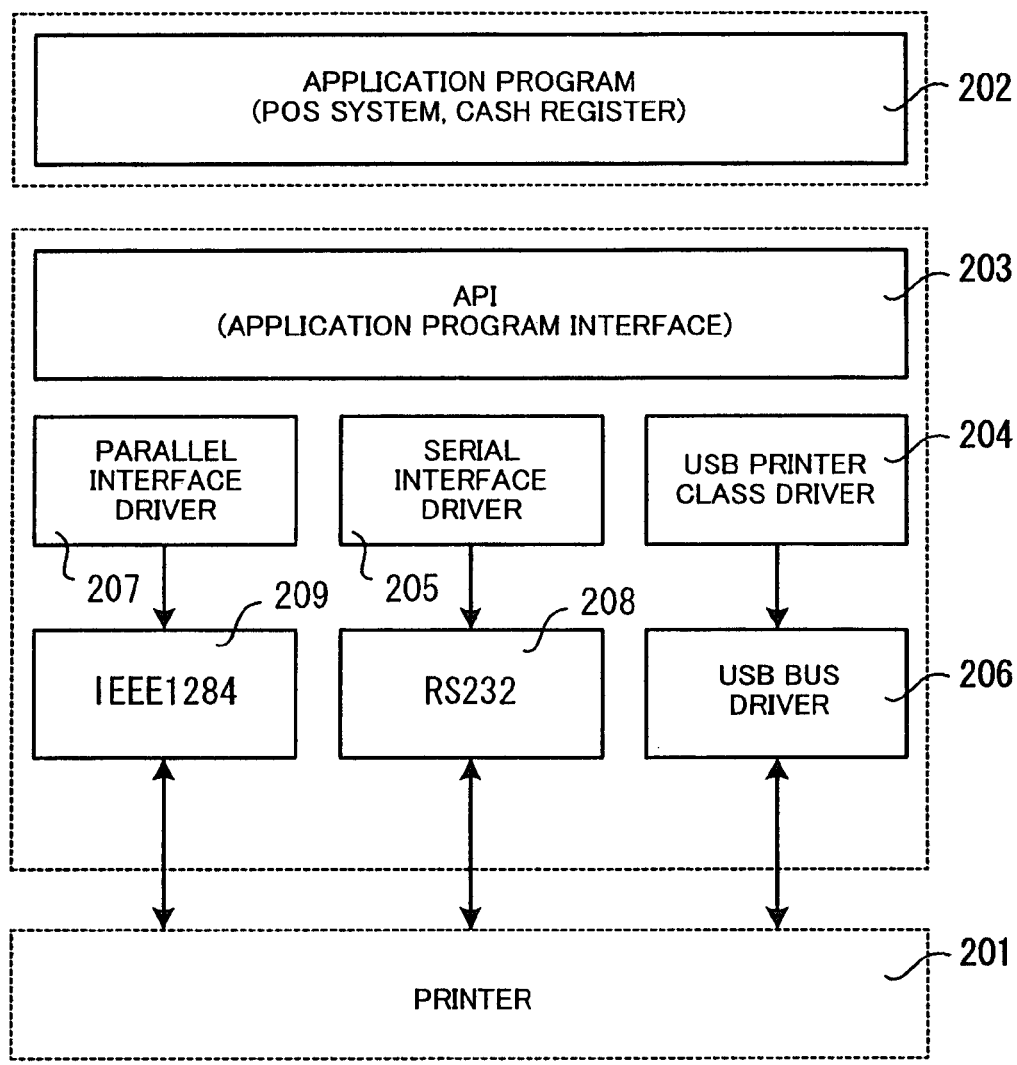
FIG. 10 is a diagram for explaining the relationship between a conventional host device and printer.
Figure 11:
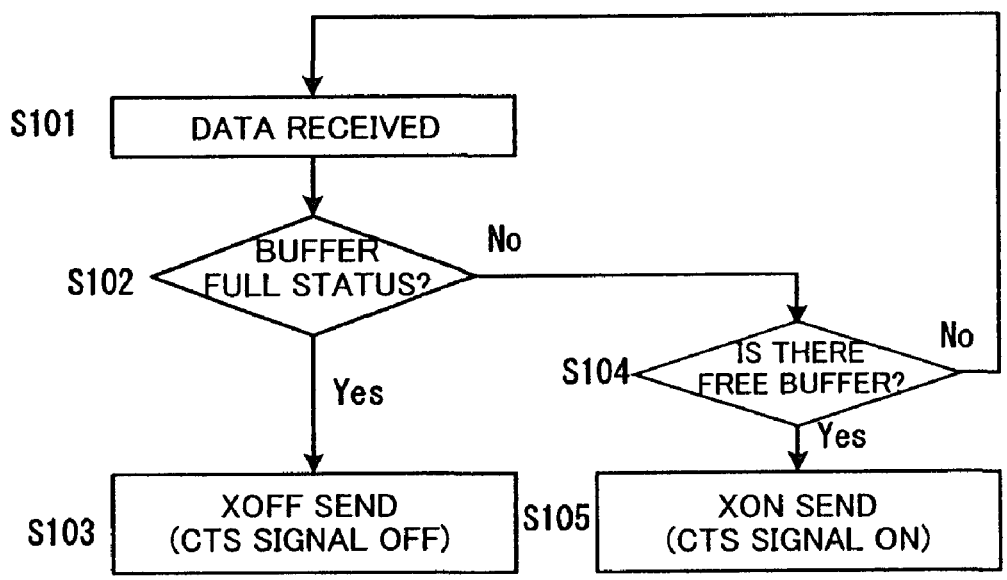
FIG. 11 is a flowchart of the printer side for explaining data flow control in a serial interface.

In the present invention, a plurality of regions are set as the aforementioned free regions, enabling a state wherein the switching to the receive buffer can be done in steps. FIG. 9 is a diagram for explaining the free region having a plurality of regions.

In FIG. 9, the communications buffer is provided with a receive buffer for storing receive data, and free regions wherein receive data is not stored, in the same manner as shown in FIG. 3, where the free region is structured including a plurality of regions. FIG. 9 shows a structure wherein the free region is provided with a first free region and a second free region (FIG. 9A).

In this structure, the switching from free regions to receive buffers is done in a stepwise manner. For example, the first free region is switched to a receive buffer in a first step, and then the second free region is switched to a receive buffer in a second step, to thereby increase the buffer size of the receive buffer in a stepwise manner. Moreover, when the buffer size of the receive buffer is reduced, the buffer size of the receive buffer is changed in a stepwise manner by setting the second free region (or first free region) in the receive buffer in a first step, and then setting the first free region (or second free region) in a second step.

FIG. 9B through FIG. 9D show examples of increasing the receive buffer in a stepwise manner. Here the communications buffer is provided at first with a receive buffer, and free regions including a first free region and a second free region (FIG. 9B). In this state, when the communications device receives an instruction that flow control is inactive, the first free region is switched to be a receive buffer, thereby increasing the buffer size of the receive buffer. This first buffer size increase causes the communications buffer to comprise an expanded receive buffer and a second free region (FIG. 9C).

Next, when the communications device receives a second instruction that flow control is inactive, the second free region is switched to a receive buffer to further increase the buffer size of the receive buffer. This second buffer size increase causes the communications buffer to comprise a further enlarged receive buffer (FIG. 9D).

In reducing the buffer size of the receive buffer, it is possible to set the free regions in a stepwise manner using a plurality of instructions that flow control is active. Note that the number of times that an instruction that the flow control is inactive or an instruction that the flow control is active is received and be counted by the flow control counter 17 in FIG. 2. The control unit 16 can check the receive buffer change status by referencing the number that is counted in the flow control counter 17. Moreover, the buffer size of the receive buffer can be changed freely, as required, depending on the count value in the flow control counter 17 and depending on whether the received flow control instruction is that the flow control is inactive or that the flow control is active.

In this way, it is possible to change in a stepwise manner the buffer size of the receive buffer by changing between a free region and a receive buffer in a stepwise manner using this plurality of regions in a structure wherein the free region includes a plurality of regions, thereby making it possible to use the free regions in a stepwise manner depending on the immediacy and importance for the data or commands requiring real-time execution.

This aspect of the present invention enables the reception of, for example, a drawer command or an error clear command in a POS system even if the receive buffer is in a buffer-full state, doing so by changing the size of the receive buffer by specifying the protocol, such as an instruction from the host device to set flow control to be active or inactive.

What is claimed is:

1. A communications system comprising:
    a host device;
    a communications buffer connected by a universal serial bus (USB) interface to the host device, and configuring an endpoint of a USB connection, wherein the communications buffer comprises a receive buffer for receiving and storing data sent from the host device;
    a control unit;
    an analyzing unit analyzing stored data that is stored in the receive buffer; and
    a forwarding unit forwarding commands that have been analyzed by the analyzing unit to an external device through the USB interface;
    wherein the control unit varies a size of the receive buffer in which the communications buffer stores the data sent from the host device, based on an instruction specifying whether flow control is active or inactive on data communicating between the host device and the receive buffer sent through a USB virtual serial communication driver from the host device, and a control is performed such that the receive buffer size is increased if the flow control is inactive and the receive buffer size is decreased if flow control is active.

2. A method of communications control in communications through USB virtual serial communication between a host device and a communications device that are connected with a USB connection, the communications device including a communications buffer having a receive buffer for receiving and storing data sent from the host device, comprising:

receiving an instruction specifying whether flow control is active or inactive on data communicating between the host device and the receive buffer sent through a USB virtual serial communication driver;

analyzing, in an analyzing unit, stored data in the receive buffer;

forwarding, in a forwarding unit, analyzed commands to an external device through the USB interface; and varying a size of the receive buffer based on the instruction for controlling the flow of data between the host device and the receive buffer sent from the host device through USB virtual serial communication, and a control is performed such that the receive buffer size is increased if the flow control is inactive and the receive buffer size is decreased if the flow control is active.

3. The communications system according to claim 1, wherein the communications buffer is provided with a memory region including a plurality of regions that can be separated and linked freely in software, the control unit controls a portion of the plurality of regions as the receive buffer and controls the rest of the regions as free regions, the receive buffer size is increased by linking the receive buffer and a free region, in software and by incorporating the free region into the receive buffer, based on the instruction specifying that the flow control is inactive, and the receive buffer size is decreased by separating, in software, the receive buffer from the free region based on the instruction specifying that the flow control is active.

4. The communications system according to claim 1, comprising: a printer buffer, wherein the printer buffer stores printing data obtained through the analysis by the analyzing unit.

5. The communications system according to claim 3, comprising: a printer buffer, wherein the printer buffer stores printing data obtained through the analysis by the analyzing unit.

6. The method of communications control according to claim 2, wherein the communications buffer comprises a memory region including a plurality of regions that can be separated or linked in software, a portion of the plurality of regions is a receive buffer, and the rest of the regions are free regions, the size of the receive buffer is increased by linking the receive buffer and a free region in software and by incorporating the free region into the receive buffer, and the receive buffer is separated from the free region in software to decrease the size of the receive buffer.

7. The method of communications control according to claim 6, wherein proportions of the plurality of regions are set freely by an instruction from the communications device side.

8. The method for communications control according to claim 2, wherein the free region includes a plurality of regions, and any given number of regions selected from the plurality of regions can be linked to the receive buffer to selectively increase the size of the receive buffer.

9. The method for communications control according to claim 6, wherein the free region includes a plurality of regions, and any given number of regions selected from the plurality of regions can be linked to the receive buffer to selectively increase the size of the receive buffer.

10. A printer comprising the communications device according to claim 1, comprising:

a printer mechanism for performing printing; and a printer buffer for storing print data used for printing in the printer mechanism, wherein the control unit stores in the printer buffer the print data obtained from the analyzing unit; and the printer mechanism is driven and controlled by commands obtained by the analyzing unit.

* * * * *